United States Patent
Brooks

[11] 3,828,331
[45] Aug. 6, 1974

[54] DEMODULATOR FOR ANGULARLY RELATED SIGNALS

[75] Inventor: Herman H. Brooks, Goleta, Calif.

[73] Assignee: Sunstrand Data Control, Inc., Redmond, Wash.

[22] Filed: July 20, 1971

[21] Appl. No.: 164,468

Related U.S. Application Data

[62] Division of Ser. No. 858,486, Sept. 16, 1969, Pat. No. 3,639,850.

[52] U.S. Cl............. 340/179, 340/198, 340/27 NA
[51] Int. Cl............................................. G08c 19/38
[58] Field of Search.................................... 340/198

[56] References Cited
UNITED STATES PATENTS

| | | | |
|---|---|---|---|
| 2,848,711 | 8/1958 | Rhodes | 340/198 |
| 3,034,053 | 5/1962 | Lanning | 340/198 |
| 3,482,231 | 12/1969 | Florek | 340/198 |
| 3,639,850 | 2/1972 | Brooks | 340/198 |

Primary Examiner—Thomas B. Habecker
Attorney, Agent, or Firm—Wegner, Stellman, McCord, Wiles & Wood

[57] ABSTRACT

A demodulator for signals angularly related to the position of a rotor of a synchro or resolver uses, in one embodiment, only one transformer in a circuit for subtracting, adding, and phase shifting the signals to produce a single signal phase shifted in proportion to the rotor angle. In another embodiment, a transformerless circuit uses an operational amplifier to derive the phase shifted signal. The phase shifted signal is compared with a reference signal to produce a rectangular wave with a variable duty cycle, which is integrated to produce a DC voltage representing the rotor angle. A pair of the circuits are used in an altitude warning system connected to synchros for the actual altitude and the command altitude of an aircraft. The derived phase shifted signals from both synchros are compared to produce a rectangular wave with a variable duty cycle, which is integrated and compared with voltages representing preselected altitudes to indicate when the aircraft is at those altitudes.

6 Claims, 3 Drawing Figures

DEMODULATOR FOR ANGULARLY RELATED SIGNALS

CROSS REFERENCE

This application is a divisional of application Ser. No. 858,486, filed Sept. 16, 1969, now Pat. No. 3,639,850 issued Feb. 1, 1972.

This invention relates to a demodulator for angularly related signals, and more particularly to a demodulator for signals from synchros, resolvers, or the like.

Typical demodulators used in determining the angular position of the rotor of resolvers or synchros use position servomechanisms or solid state converter circuits. In a solid state converter for demodulating the signals from the three stator windings of a synchro, a transformer is typically coupled across each of the three combinations of pairs of windings. The output of each transformer, representing the subtraction of the stator signals, is summed and subsequently added to the third subtracted signal phase shifted by 90°. The resulting signal is phase-shifted, with respect to the energizing signal for the rotor winding, in direct proportion to the angular position of the rotor.

To detect the phase shift, the resulting signal is differentiated and used to set a flip-flop which is reset by the differentiated energizing signal for the rotor winding. The output from the flip-flop is a rectangular wave having a duty cycle proportional to the phase difference between the resulting and energizing signals. The rectangular wave is integrated to produce a DC voltage whose amplitude is proportional to the duty cycle of the wave, and hence to the angular position of the rotor winding.

While solid state converters of the above type eliminate many of the problems of position servomechanisms, their cost is prohibitive in many applications. In accordance with the present invention, a demodulator is disclosed which eliminates one or more transformers which heretofore have been necessary in such demodulators. The circuit includes at least one noninductive path for summing a pair of signals from the secondary windings of a source of angularly related signals. In one embodiment of the invention, a single transformer is used to provide signal subtraction. In another embodiment of the invention, all transformers are eliminated from the circuit, and subtraction is accomplished by using an operational amplifier or other differential amplifying device.

In accordance with another aspect of the invention, an improved circuit is disclosed for comparing the signals from two synchros or resolvers. In prior comparison circuits, the angularly related signals from each synchro or resolver have been demodulated to generate DC voltages having amplitudes directly proportional to angular position. The pair of DC voltages are then compared to determine the angular difference between the rotors of the two synchros or resolvers.

In the present invention, the sets of signals from the two synchros or resolvers are each demodulated to form two signals, each phase shifted proportional to the angular position of the rotor of its corresponding synchro or resolver. These phase shifted signals are directly compared to form a rectangular wave having a duty cycle proportional to the phase difference between the phase shifted signals. The rectangular wave is then integrated to provide a direct indication of the angular difference between the pairs of rotors. Such a circuit eliminates portions of the demodulator and integrators circuits heretofore required, and also greatly increase the accuracy of the circuit.

One object of the present invention is the provision of an improved demodulator for angularly related signals.

Another object of the present invention is the provision of a demodulator circuit which eliminates one or more transformers. In one form of the circuit, only a single transformer is used to subtract angularly related signals, while noninductive means is used to sum the same signals. In another form of the circuit, a transformer-less demodulator performs signal subtraction by differential amplifying devices.

A further object of this invention is the provision of a demodulator and comparator for two or more groups of angularly related signals. A phase shifted signal is derived from each group of angularly related signals, and all phase shifted signals are directly compared to determine the angular relationships.

Further objects and features of the invention will be apparent from the following description, and from the drawings, in which.

Figure 1:
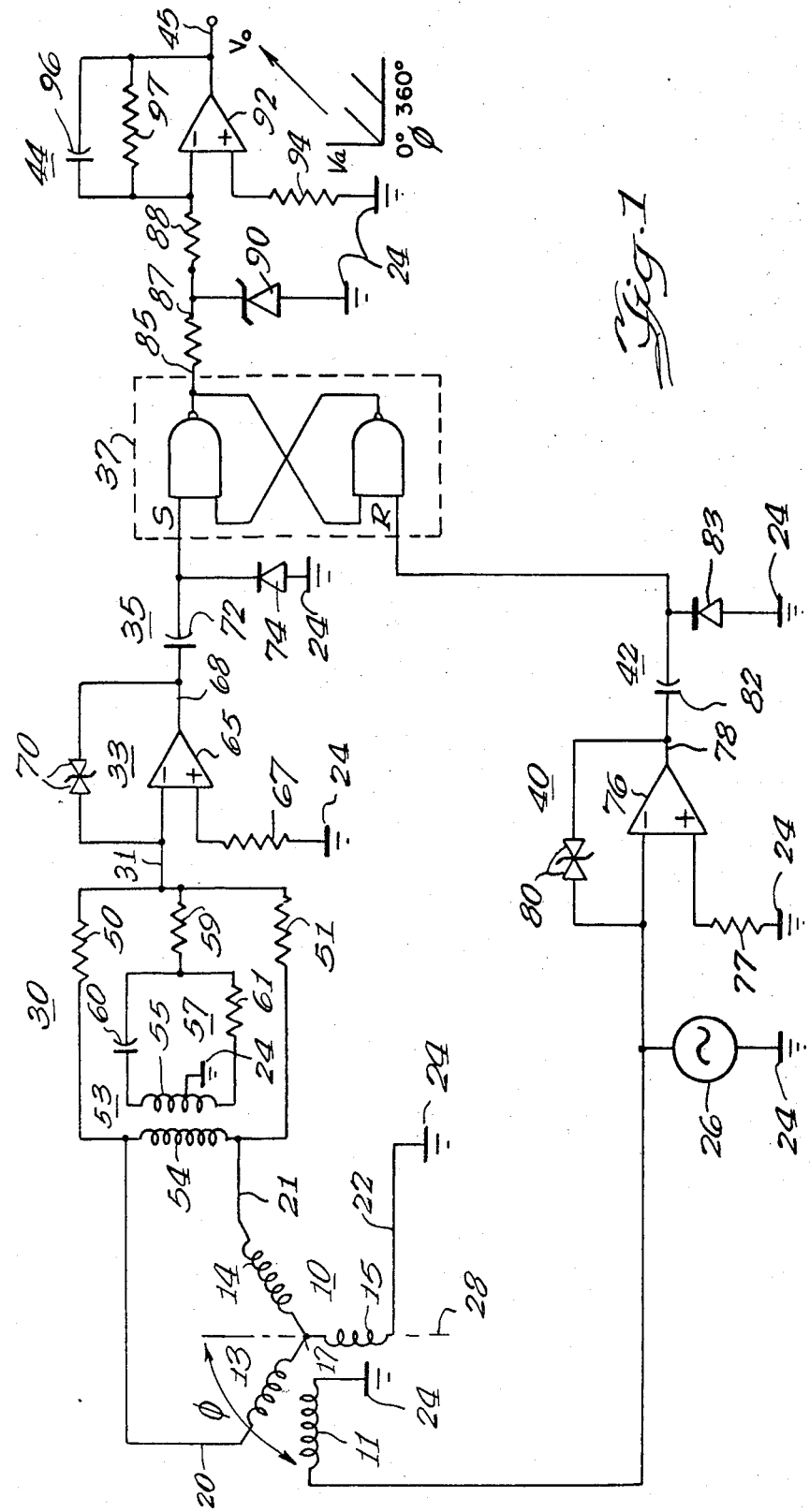
FIG. 1 is a schematic diagram of a demodulator for a source of angularly related signals, using a single transformer.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Turning to FIG. 1, a demodulator is illustrated for a source 10 of angularly related signals. For illustration, source 10 is in the form of a synchro having a primary or rotor winding 11 movable with respect to three secondary or stator windings 13, 14, and 15, but the source may also be a resolver or similar device. One end of each stator winding is joined to a common junction 17. The opposite ends of the stator windings 13, 14, and 15 are externally available on lines 20, 21, and 22, respectively. Rotor winding 11 is energized by a source 26 of AC signal, such as 400 Hertz frequency. Source 26 is coupled to one side of rotor winding 11, and to the other side via a source of reference potential or ground 24. As is well known, the output signals on lines 20, 21, and 22 bear a predetermined relation dependent on the angle $\phi$ between the rotor winding 11 and a reference axis 28 of the synchro.

To demodulate the signals from the synchro, a circuit 30 forms on a line 31 a single signal phase shifted with respect to the AC signal from source 26 by an amount directly proportional to angle $\phi$. This signal is coupled through a squaring circuit 33 and differentiator 35 to the set input S of a flip-flop or latch circuit 37. The reference signal from source 26 similarly is coupled through a squaring circuit 40 and a differentiator 42 to the reset input R of latch 37. The output of latch 37 is a rectangular wave or pulse having a duty cycle or pulse width directly proportional to the angle $\phi$. The rectangular wave is coupled to an integrator 44 to produce, on an output line 45, a DC voltage $V_o$ having an amplitude directly proportional to the angle $\phi$. The amplitude of voltage $V_o$ has a unique value for all angles of $\phi$ from 0° through 360°.

Considering the demodulator in more detail, converter 30 resolves the three signal output of the synchro into two signal components which are combined at line 31. Line 22 of stator winding 15 is directly connected to ground 24. Line 20 is connected through a resistor 50 to summing line 31, and line 21 is similarly connected through a resistor 51, of the same value as resistor 50, to summing line 31. Resistors 50 and 51 form a noninductive electrical path for obtaining on line 31 a signal sum component which represents the sum of the output signals on lines 20 and 21.

To obtain the difference between the same output signals, a single transformer 53 is utilized. The primary winding 54 of transformer 53 is coupled across lines 20 and 21, resulting in a signal difference component being impressed across a secondary winding 55 of transformer 53. Secondary winding 55 is coupled through a 90° phase shift network 57, for a 400 Hertz signal, and a summing resistor 59 to line 31. Considering network 57 in more detail, secondary winding 55 has a center tap connected to ground 24. A capacitor 60 is coupled from one side of winding 55 to resistor 59, and a resistor 61 is coupled from the other side of winding 55 to resistor 59.

The difference component, phase shifted by 90°, is summed on line 31 with the sum component. The resulting signal on line 31 is an AC sine wave whose phase, with respect to the phase of the AC exitation from source 26, is a linear function of the shaft angle $\phi$. When rotor winding 11 is aligned with axis 28, the signal summed component is maximum and the signal difference component is a minimum. As the synchro shaft turns, the sum component decreases and the difference component increases, until at $\phi$ equals 90° the sum component is a minimum and the difference component is a maximum. Continued shaft rotation causes the sum component to again increase, but with the opposite phase from that which existed when $\phi$ was in the first quadrant.

Converter circuit 30 combines these components so that the signal on line 31 consists of the sum component without any phase shift, added to the difference component with a 90° phase shift. The vector sum is a sine wave whose phase is shifted in direct proportion to the shaft angle $\phi$. While network 30 has been illustrated for the difference component, it will be apparent that the sum component could be shifted, and that the amount of shift may be any odd multiple, such as one, of 90°, depending on the exact nature of the desired signal on line 31.

Squarer 33 converts the sine signal on line 31 into a square wave. This is accomplished by connecting the (−) input of an operational amplifier 65 to line 31, and the (+) input of operational amplifier 65 through a resistor 67 to ground 24. Operational amplifier 65 has a feedback element consisting of a pair of back-to-back Zener diodes 70 coupled from an output line 68 to the (−) input of the operational amplifier.

The square wave signal on line 68 is differentiated at 35 by a capacitor 72 coupled in series between line 68 and the set input S of latch 37. To eliminate negative going spikes, a diode 74 is coupled between ground 24 and the set input S. Latch 37, which may be formed by a pair of NAND gates, is thus set once for each cycle of the square wave.

For phase comparison, the reference signal is squared and differentiated by similar circuits. Reference source 26 is connected to the (−) input of an operational amplifier 76, functioning as squarer 40. The (+) input is connected via resistor 77 to ground 24. An output line 78 of amplifier 76 has a pair of back-to-back Zener diodes 80 connected as a feedback element with the (−) input. The resulting square wave on output line 78 is differentiated at 42 by a capacitor 82, shunted to ground 24 through a diode 83, to produce unidirectional going spikes coupled to the reset input R of latch 37.

Latch 37 operates in a known manner to produce an output rectangular waveform, on a line 85, which has a duty cycle directly proportional to the phase difference between the square wave signals from amplifiers 65 and 76. To maintain the output rectangular wave at a constant amplitude, line 85 is coupled through a pair of series connected resistors 87 and 88 to integrator 44. The junction between resistors 87 and 88 is shunted to ground 24 through a Zener diode 90. Integrator 44 integrates the variable duty cycle rectangular wave to obtain an output signal $V_o$, on line 45, which has a DC amplitude directly proportional to the duty cycle.

Integrator 44 consists of an operational amplifier 92 having its (−) input connected to resistor 88, and its (+) input connected through resistor 84 to ground 24. The output line 45 from operational amplifier 92 is coupled through a parallel connected capacitor 96 and resistor 97 to the (−) input, thereby forming a capacitive feedback element which converts the operational amplifier into an integrator. The resulting output signal $V_o$ has a DC amplifier directly linearly proportional to the shaft angle $\phi$, as shown in the chart of voltage $V_o$ versus shaft angle $\phi$.

Figure 2:
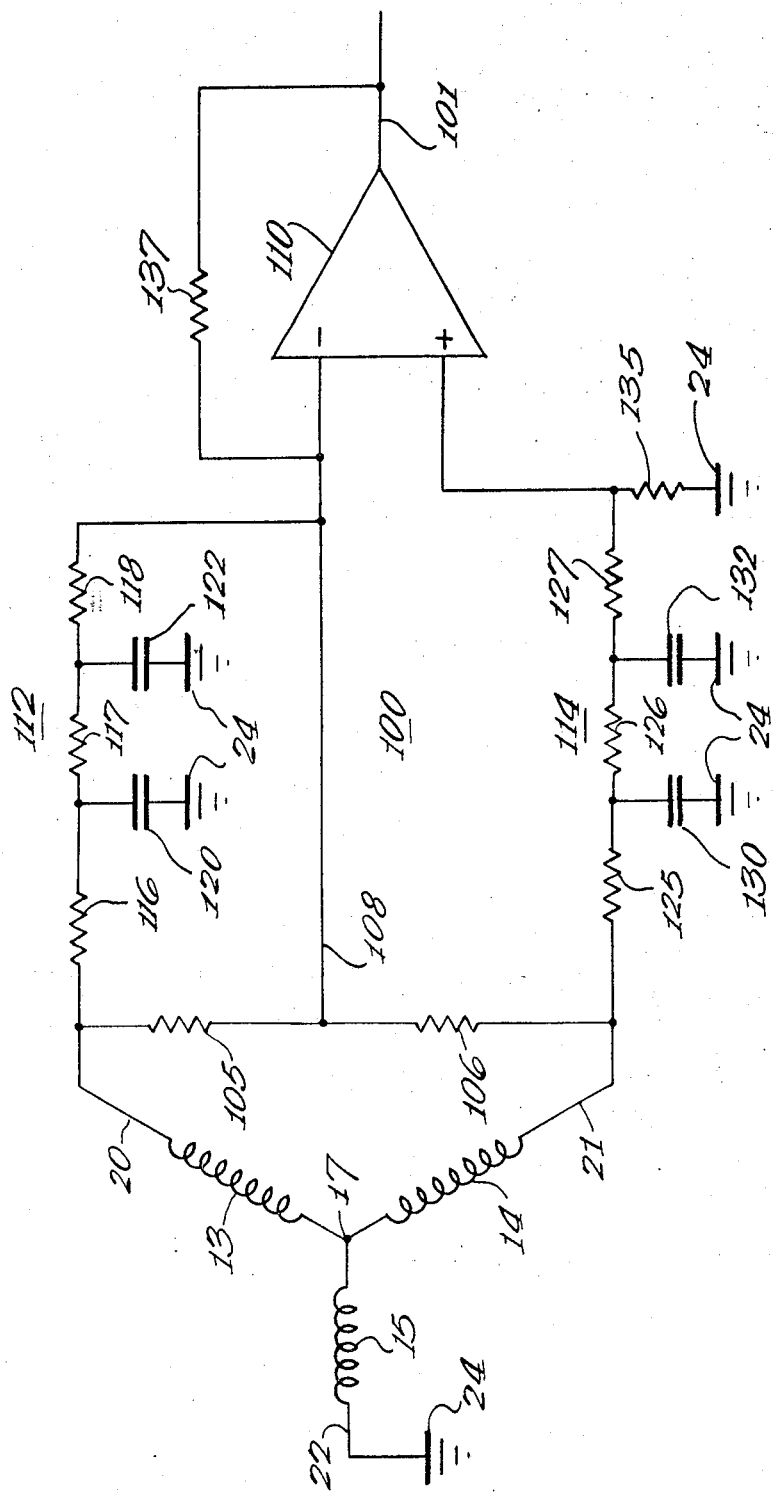
FIG. 2 is a schematic diagram of a modification to a portion of FIG. 1, eliminating the single transformer.

In FIG. 2, a converter circuit 100 is illustrated which eliminates all transformers, and may be used in place of the converter circuit 30 and squaring amplifier 33 of FIG. 1. Circuit 100 is effective to convert the signals on the stator windings into a single signal, on a line 101, which is phase shifted by an amount directly, linearly proportional to the angle $\phi$ of the rotor winding 11 of FIG. 1.

Considering FIG. 2 in detail, the signals on lines 20 and 21 are combined into a signal sum component by resistors 105 and 106, which connect lines 20 and 21 to a common summing line 108. Summing line 108 is coupled to the (−) input of a differential amplifying device, such as an operational amplifier 110, the output of which forms line 101. To derive a signal difference component, the line 20 is coupled through a 90° phase shift network 112 to the (−) input, and line 21 is coupled through a 90° phase shift network 114 to the (+) input of operational amplifier 110. The operational amplifier performs the subtraction process.

Phase shift networks 112 and 114 may be conventional circuits for phase shifting a signal of the frequency of the energizing source by 90 electrical degrees. Illustratively, network 112 consists of resistors 116, 117, and 118 series connected between line 20 and line 108. The junction between resistors 116 and 117 is shunted to ground 24 through a capacitor 120, and the junction between resistors 117 and 118 is similarly shunted to ground 24 through a capacitor 122. In a like manner, network 114 is formed of resistors 125, 126, and 127 connected in series between line 21 and the (+) input of operational amplifier 110. The junction between resistors 125 and 126 is coupled through a capacitor 130 to ground 24, and the junction between resistors 126 and 127 is coupled through a capacitor 132 to ground 24. The (+) input of operational amplifier 110 is also coupled through a resistor 135 to ground 24. A feedback resistor 137 is coupled between the output line 101 and the (−) input of amplifier 110.

In operation, the difference component is formed by the signal subtraction performed by operational amplifier 110. Because the input signals are each phase shifted 90° by networks 112 and 114, the signal difference component on line 101 is similarly shifted by 90°. Due to feedback resistor 137, the amplifier 110 sums the signal difference component with the signal sum component which also inputs at the (−) input, producing a resulting signal on line 101 identical to the signal produced on line 31 of FIG. 1. Desirably, operational amplifier 110 is allowed to saturate, or includes additional feedback elements which cause it to act as a squaring amplifier. In such a case, circuit 100 may replace both circuits 30 and 33 of FIG. 1. The resulting signal may be coupled to the remaining phase comparison circuit of FIG. 1, in order to generate voltage $V_o$.

Figure 3:
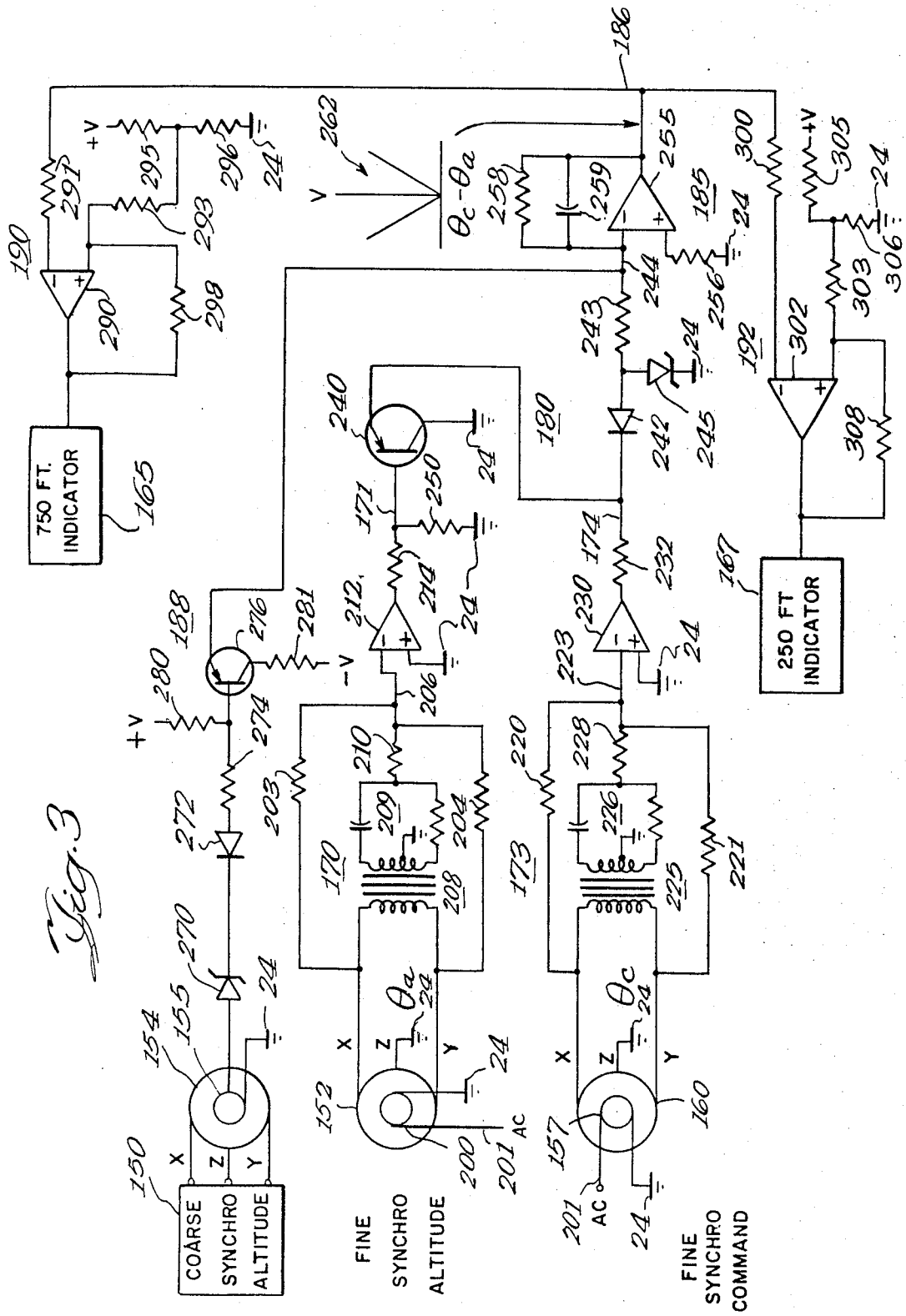
FIG. 3 is a schematic diagram of a demodulator and comparator for two groups of angularly related signals, embodied in an altitude warning indicator for an aircraft.

Turning to FIG. 3, an improved system is illustrated for comparing the angular relation between plural signals, in order to produce an output signal representative of the angular difference. Illustratively, the system, which uses portions of the circuit of FIG. 1, is embodied in an altitude warning indicator for an aircraft. Such an indicator provides an alarm or warning to a pilot upon the aircraft approaching a preselected altitude, so that the pilot has sufficient time to establish level flight at the preselected altitude.

The actual altitude of the aircraft is indicated by a coarse synchro 150 and a fine synchro 152, connected in a conventional manner to the altimeter of the aircraft. Coarse synchro 150, for example, may rotate one turn for each 135,000 feet of altitude, and fine synchro 152 may rotate one turn for each 5,000 feet of altitude. The coarse synchro 150 produces signals on stator windings X, Y, and Z which energize the stator windings of a second coarse synchro 154. The synchro 154 has a rotor 155 manually rotatable by the pilot to select a desired coarse altitude at which the aircraft is to level off, in either ascent or descent. To select the fine altitude, a rotor 157 of a fine synchro 160 is also manually rotatable. Desirably, rotors 155 and 157 are interconnected to a single altitude select knob having a range of selectable altitudes, as from sea level to 49,000 feet in 100 foot increments.

The circuit of FIG. 3 is effective to compare the actual altitude with the command or selected altitude, as indicated by the angular relation between the shafts of the synchros. When the aircraft approaches, in either an ascent or descent, within 750 feet of the selected or commanded altitude, an indicator 165 is energized. When the aircraft approaches within 250 feet of the selected altitude, an indicator 167 is energized, thereby providing indications necessary for the pilot to level off in sufficient time so as to establish level flight at the preselected altitude.

To accomplish altitude comparison, the actual altitude fine synchro 152 is coupled through a comparator circuit 170, of the type generally disclosed at 30 and 33 of FIG. 1, to produce an output signal on a line 171 which is phase shifted, with respect to a common energizing signal for all synchros, in proportion to the angle of the rotor shaft of synchro 152. For comparison with the commanded altitude, a comparator circuit 173, similar to circuit 170, is coupled to the command altitude fine synchro 160, to produce an output signal on a line 174 which is phase shifted, with respect to the same energizing signal, in proportion to the angular position of the rotor shaft 157.

The output signals on lines 171 and 174 are compared by a phase comparison circuit 180 to generate a rectangular wave having a duty cycle directly proportional to the phase difference between the output signals. The rectangular wave is integrated by an integrator 185 to generate on a line 186 a DC voltage whose amplitude is proportional to the duty cycle, and thus proportional to the difference between the actual and commanded fine altitudes.

Coarse synchro 154 is connected to a disabling circuit 188 which disables the integrator 185 except when the aircraft approaches within the range in which the fine synchros are effective. For example, disabling circuit 188 ceases to block integrator 185 when the altitude deviation becomes less than 1,800 feet. The DC voltage on line 186, when the integrator 185 is unblocked, is coupled to a level comparator 190 which compares the voltage with a preselected voltage presenting 750 feet altitude difference. When a comparison occurs, the 750 feet indicator 165 is energized. Line 186 is also coupled to a level comparator 192 for comparison with a voltage representing 250 feet. When a comparison occurs, indicator 167 is energized.

Considering FIG. 3 in detail, synchro 152 has a rotor 200 connected across a source of energizing AC voltage, of 400 Hertz frequency, available across a line 201 and ground 24. Rotor 200 is mechanically coupled to the altimeter (not illustrated) of the aircraft, so that the output signals from the stator windings, on lines X, Y, and Z, represent the actual altitude of the aircraft. The output signals are partially demodulated by circuit 170, which is identical to the circuit 30 in FIG. 1. That is, resistors 203 and 204 form a sum component on a line 206, and a transformer 208 forms a difference component which is phase shifted 90° by a network 209 and then summed through resistor 210 to line 206. The resulting signal on line 206 is a sine wave phase shifted by an amount proportional to the angle $\phi_a$ between the rotor 200 and the stator of synchro 152. Line 206 is coupled to the (−) input of an operational amplifier 212, the (+) input of which is connected to ground 24. Amplifier 212 is allowed to saturate, producing a square wave which is coupled through a resistor 214 to line 171. While the circuit of FIG. 1 has been used, it will be apparent that the circuit of FIG. 2 could be used in place thereof.

In a similar manner, output signals from the command fine synchro 160 are partially demodulated by a circuit 173 to produce on a line 174 a phase shifted square wave representing the angle $\theta_c$. Rotor 157 of synchro 160 is rotated by the pilot to the desired or commanded altitude. When the signals on lines X, Y, and Z of synchro 160 match the signals on lines X, Y, and Z of synchro 152 the commanded and actual fine altitudes are equal. Like circuit 170, the X and Y windings of synchro 160 are coupled through summing resistors 220 and 221 to a line 223. A transformer 225 produces a difference component signal, phase shifted 90° by a network 226, and coupled through summing resistor 228 to line 223. Line 223 is coupled to the (−) input of an operational amplifier 230, the (+) input of which is connected to ground 24. Amplifier 230 is allowed to saturate, generating a square wave coupled through a resistor 232 to line 174. The square wave, of 400 Hertz frequency, has a phase shift, compared to the common AC energizing signal for both synchros 152 and 160, proportional to the angular rotation $\theta_c$ of the command fine synchro rotor 157.

Phase comparator 180 is responsive to the square waves on lines 171 and 174 to produce an output rectangular wave or pulse having a duty cycle linearly proportional to the phase difference between the square waves. This is accomplished by rectifying and limiting the square wave on line 174, and sampling it by switching a transistor 240 under control of the square wave on line 171.

Line 174 is coupled through a didode 242 and a resistor 243 to an output line 244 which forms an input for integrator 185. The junction between diode 242 and resistor 243 is shunted to ground 24 through a Zener diode 245. Diode 242 and Zener diode 245 produce a negative square wave on line 244 which, except for the effect of transistor 240, is the same as the square wave on line 174, with a precise, constant amplitude. Line 171 is coupled to the base of PNP transistor 240, whose emitter is directly coupled to line 174. The collector of transistor 240 is coupled directly to ground 24. For biasing, the base is also coupled through a resistor 250 to ground 24.

Transistor 240 is driven into conduction by the positive going portion of the square wave from amplifier 212. When the output waveform of amplifier 212 is negative, and the output waveform of amplifier 230 is positive, a negative voltage is coupled to line 244. For any other combination of outputs for amplifiers 212 and 230, it will be apparent that the output voltage at line 244 is zero. Thus, the length or duty cycle of the negative voltage pulse at line 244 is equal to the difference in phase between the square waves from amplifiers 212 and 230.

Integrator 185 is responsive to the negative going rectangular wave on line 244 to produce a positive DC voltage on an output line 186, which voltage is linearly proportional to the duty cycle and hence equals to $\theta_c - \theta_a$, the difference between the commanded and actual fine synchro altitudes. Integrator 185 consists of an operational amplifier 255 whose (−) input is directly connected to line 244, and whose (+) input is connected through a resistor 256 to ground 24. A feedback element between output line 186 and the (−) input is in the form of a paralleled resistor 258 and capacitor 259. The resulting positive DC voltage V on line 186 is illustrated at 262, and has the same amplitude for equal altitude deviations above or below the preselected altitude.

Inhibitor 188 is used to disable integrator 185 until the fine synchro is within 360° (5,000 feet) of the selected altitude. The coarse altitude synchro 150, connected to the altimeter of the aircraft, provides input signals to the stator windings of synchro 154. The rotor winding 155 of synchro 154, in conjunction with rotor 157, is rotated by the pilot to a position representing the desired altitude, as previously explained. The output of rotor winding 155 is coupled through a Zener diode 270, a rectifying diode 272, and a resistor 274 to the base of a PNP transistor 276. The base of transistor 276 is also coupled through resistor 280 to a source of positive DC voltage, labeled +V. The collector of transistor 276 is coupled through a resistor 281 to a source of minus DC voltage, labeled −V. The emitter of transistor 276 is directly coupled to input line 244 of integrator 185.

In operation, when the altitude deviation exceeds 1,800 feet, the half wave rectified error output of rotor winding 155 is of sufficient amplitude to forward bias transistor 176. The forward bias level is determined by Zener diode 270 and resistors 274 and 280. Transistor 276 is connected as a switch, and when forward biased switches negative DC voltage to summing line 244. The negative voltage saturates operational amplifier 255, producing a constant positive DC voltage on line 186 of greater amplitude than the voltage corresponding to the 750 foot altitude. As the altitude deviation becomes less than 1,800 feet, transistor 274 is driven nonconductive, disconnecting the negative voltage from line 244 and enabling normal operation of integrator 185.

For one specific circuit, voltage V on line 186 equaled 10 volts for 1,000 feet altitude difference. Level comparators 190 and 192 compare voltage V with preselected voltages representing the altitudes at which warnings are to be given, to generate signals which energize the appropriate indicators 165 and 167.

Level indicator 190 consists of an operational amplifier 290, having a (−) input connected through a resistor 291 to line 186. The (+) input is connected through a resistor 293 to a voltage divider, consisting of resistors 295 and 296 connected in series between +V and ground 24. The output of operational amplifier 190 is coupled to indicator 165, which may consist of visual and/or audible alarms. A feedback resistor 298 is coupled between the output and the (+) input. In operation, the vlaues of resistors 295 and 296 are selected so that the voltage at their junctions equals the voltage on line 186 when the desired warning altitude is reached. In the present example, the voltage to resistor 293 is 7.5 volts, since a signal of 7.5 volts on line 186 represents a 750 foot altitude difference.

Level comparator 192 is similar to comparator 190, except that a different level of voltage is chosen for comparison purposes. Line 186 is coupled through a resistor 300 to the (−) input of an operational amplifier 302. The (+) input of operational amplifier 302 is coupled through a resistor 303 to a voltage divider, consisting of resistors 305 and 306 in series between +V and ground 24. A feedback resistor 308 is coupled between the output and the (+) input of the operational amplifier. In the present example, the values of resistors 305 and 306 are chosen so that the voltage at the junction therebetween is 2.5 volts, providing an output to indicator 167 when the voltage V on line 186 drops below 2.5 volts, representing less than a 250 foot altitude difference. Indicator 167, like indicator 165, may be a combination of visual and/or audible alarms.

The above altitude warning system provides many advantages over prior systems. Circuits 170 and 173 produce outputs which are a linear function of shaft angle position, rather than a sine function, producing a constant signal gradient, and no ambiguity at the 180° zero crossing point. Because comparator 180 is only responsive to phase shift, the circuit is unaffected by voltage fluctuations or frequency variations of the energizing AC source for the synchros. Comparator 180 also eliminates circuit otherwise necessary for comparing each synchro signal with a reference, and integrating the result to produce DC signals which must be compared to determine altitude. This also eliminates accumulation of errors which would otherwise occur. Other advantages will be apparent to those skilled in the art.

I claim:

1. In a system including an input source of plural signals representing the angular position of an input element and a command source of plural signals representing the angular position of a command element, a circuit for converting the plural signals into an analog signal representing the angular relation between said input element and said command element, comprising:

means for providing a reference signal to said input source and said command source;

means coupled to said input source for converting the plural signals therefrom into an input signal phase shifted with respect to said reference signal by an amount corresponding to the angular position of said input element;

means coupled to said command source for converting the plural signals therefrom into a command signal phase shifted with respect to said reference signal by an amount corresponding to the angular position of said command element;

means coupled to said input signal converting means and said command signal converting means for comparing the phases of said input signal and said command signal to generate a waveform having a duty cycle directly proportional to the phase difference between said input signal and said command signal; and integrator means coupled to said comparing means for integrating said waveform to generate an analog signal having an amplitude directly proportional to the duty cycle of said waveform and representing said angular relation.

2. The converting circuit of claim 1 in a system for indicating when said input elements has a predetermined angular relation with respect to said command element, including indicating means coupled to said integrator means for producing an indicating signal when the amplitude of said analog signal equals a value corresponding to said predetermined angular relation.

3. The converting circuit of claim 2 wherein said indicating means includes means establishing a reference signal having an amplitude representing said predetermined angular relation, and amplitude comparing means coupled to said integrator means and said establishing means for generating said indicating signal when the amplitude of said analog signal has a preselected relationship with respect to the amplitude of said reference signal.

4. The converting circuit of claim 1 wherein said comparing means includes squaring means coupled to one of said input signal converting means and said command signal converting means for limiting the amplitude of the waveform therefrom, and sampling means coupled to the other of said input signal converting means and said common signal converting means for precluding a portion of the limited signal of said squaring means from passing to said integrator means during the presence of predetermined portions of the phase shifted signal from said other means.

5. The converting circuit of claim 4 including a source of reference potential and wherein said sampling means includes gating means coupled between said squaring means and said source of reference potential, and means coupling said other signal to said gating means, said gating means shunting said limited signal of said squaring means to said reference potential for similarly going portions of the phase shifted signal from said other means.

6. The converting circuit of claim 1 wherein said input signal converting means and said command signal converting means each includes a summing point, non-inductive means coupled between the associated source of plural signals and the summing point for adding said plural signals to form a sum signal, means coupled between the associated source and the summing point for subtracting said plural signals to form a difference signal, means for effectively phase shifting said difference signal by an odd multiple of 90° to form a shifted difference signal, and means for combining said shifted difference signal and said sum signal to form said input signal and said command signal, respectively.

* * * * *